(12) United States Patent
Humphreys et al.

(10) Patent No.: US 9,366,380 B2
(45) Date of Patent: Jun. 14, 2016

(54) FIXTURE HOUSING USING DOG EARS

(71) Applicants: Tyler Humphreys, Henderson, NV (US); Jeremy Burkhardt, Henderson, NV (US); Ken Humphreys, Henderson, NV (US); Edward Haase, Henderson, NV (US)

(72) Inventors: Tyler Humphreys, Henderson, NV (US); Jeremy Burkhardt, Henderson, NV (US); Ken Humphreys, Henderson, NV (US); Edward Haase, Henderson, NV (US)

( * ) Notice: Subject to any disclaimer, the term of this patent is extended or adjusted under 35 U.S.C. 154(b) by 13 days.

(21) Appl. No.: 14/511,139

(22) Filed: Oct. 9, 2014

(65) Prior Publication Data

US 2016/0102803 A1    Apr. 14, 2016

Related U.S. Application Data

(60) Provisional application No. 61/888,936, filed on Oct. 9, 2013.

(51) Int. Cl.
*G12B 9/00* (2006.01)
*F16M 13/02* (2006.01)
*F16B 2/12* (2006.01)
*H04R 1/02* (2006.01)

(52) U.S. Cl.
CPC ............. *F16M 13/02* (2013.01); *F16B 2/12* (2013.01); *F16M 13/027* (2013.01); *H04R 1/026* (2013.01); *H04R 2201/021* (2013.01)

(58) Field of Classification Search
CPC ........ F16M 13/02; F16M 13/027; F16B 2/12; H04R 1/026; H04R 2201/021
USPC ........................................... 248/27.3
See application file for complete search history.

(56) References Cited

U.S. PATENT DOCUMENTS

| 3,518,420 | A |  | 6/1970 | Kripp |
| 4,048,491 | A |  | 9/1977 | Wessman |
| 4,250,540 | A |  | 2/1981 | Kristofek |
| 4,293,895 | A |  | 10/1981 | Kristofek |
| 4,431,151 | A |  | 2/1984 | Schonasky |
| 4,673,149 | A |  | 6/1987 | Grote et al. |
| 4,739,460 | A |  | 4/1988 | Kelsall |
| 5,377,088 | A |  | 12/1994 | Lecluze |
| 5,609,414 | A |  | 3/1997 | Caluori |
| 5,941,625 | A |  | 8/1999 | Morand |
| 5,964,523 | A | * | 10/1999 | Eversberg ............... F21V 21/04 362/148 |
| 6,554,458 | B1 |  | 4/2003 | Benghozi |
| 6,588,543 | B1 | * | 7/2003 | Tchilinguirian ........ F21V 21/04 181/150 |
| 6,827,471 | B1 |  | 12/2004 | Benghozi |
| 6,896,394 | B2 |  | 5/2005 | Houle |
| 7,399,104 | B2 |  | 7/2008 | Rappaport |
| 7,731,130 | B2 | * | 6/2010 | Decanio ............... H04R 1/2873 248/27.3 |

(Continued)

*Primary Examiner* — Mark Wendell
(74) *Attorney, Agent, or Firm* — Kirk A. Buhler; Buhler & Associates

(57) ABSTRACT

Improvements in a fixture housing with dog ears is disclosed that can be installed from one side of a wall or ceiling. This increases the ability of the installer to place the fixture in a desired location as opposed to using a location that provides the best access on stud or joists. Once the ideal location is identified the installer uses a saw to cut an opening in the desired location. The housing is pushed into the opening for installation without requiring access to the back of the wall, ceiling or floor. The fixture housing uses a plurality of spring loaded dogs that are operated from the visible wall or ceiling surface. It is also possible for the fixture to be removed by lifting the locking tabs and sliding securing ears where the entire fixture can then be pulled back through the open hole.

19 Claims, 7 Drawing Sheets

(56) References Cited

U.S. PATENT DOCUMENTS

| | | | | |
|---|---|---|---|---|
| 7,780,135 B2 * | 8/2010 | Nelson | ............. | H04R 1/025 181/150 |
| 8,490,938 B2 * | 7/2013 | Peng | ............. | H04R 1/025 181/150 |
| 9,084,046 B2 * | 7/2015 | Ivey | ............. | H04R 1/025 |
| 2004/0179710 A1 * | 9/2004 | Farinelli, Jr. | ............. | H04R 1/025 381/386 |
| 2004/0257818 A1 | 12/2004 | Benghozi | | |
| 2007/0121988 A1 * | 5/2007 | Merrey | ............. | H04R 1/025 381/386 |

* cited by examiner

FIXTURE HOUSING USING DOG EARS

CROSS REFERENCE TO RELATED APPLICATIONS

This application claims the benefit of Provisional Application Ser. No. 61/888,936 filed Oct. 9, 2013 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to improvements in a fixture housing for recessed speaker. More particularly, the present fixture housing allows for quick installation of the housing by using a plurality of one-way securing members to connect the housing with the fascia trim.

2. Description of Related Art Including Information Disclosed Under 37 CFR 1.97 and 1.98.

In some home speakers are placed in recessed fixtures, these fixture are often similar to electrical lighting fixtures that are placed in the ceiling as recessed lighting. In this form of lighting a hole is made in the ceiling and a fixture is secured within the hole. Electrical wiring is connected to the fixture and lighting is placed into the recessed fixture to provide lighting that essentially shines downward. In new home construction the fixture is often secured to a horizontal ceiling joist. In other installations the fixture is secured to drywall or sheetrock between the joists where it may or may not be secured to the two adjacent joists. In any of these cases, after installation of the drywall or sheetrock a hole is cut through the sheetrock or drywall and the cosmetic fascia or trim is installed to the recessed fixture. In all installations within a house or building performing the installation is a quick and efficient manner reduces the cost to construct the building or house. While the installation is typically installed in the ceiling, the installation can also be installed in a vertical wall for speakers, controls or other purposes.

A number of patents and or publications have been made to address these issues. Exemplary examples of patents and or publication that try to address this/these problem(s) are identified and discussed below.

U.S. Pat. No. 4,250,540 issued on Feb. 10, 1981 to Paul J. Kristofek discloses a mounting Arrangement for Recessed Light Fixture Housing. To install the invention disclosed in this patent a user pushes the main housing into a hole and then engages clips that are secured with detents on the side of the main housing. While this patent discloses a recessed lighting housing the flange is integrated with the main housing and the electrical connection is from a separate socket that is installed into the top of the main housing.

U.S. Pat. No. 7,399,104 issued on Jul. 15, 2008 to Margaret Rappaport discloses a Universal Trim for Recessed Lighting. This patent uses a series of alternating tabs that grasp the inner and outer walls of a housing to retain the decorative trim plate. While the patent discloses a method of securing and removal of the trim piece, there is no retention of the housing within the hole.

U.S. Pat. No. 3,518,420 issued on Jun. 30, 1970 to R. M. Kripp discloses a Recessed Light Fixture. The recessed light fixture uses a series of slots and pins to retain the trim plate onto the housing. The electrical connection is wired directly into the top of the housing. The connection is with slots and pins and requires an installer to have access to both sides of the ceiling to secure the fixture and bezel.

What is needed is a fixture that uses a plurality of one-way securing elements to center and lock the cosmetic bezel to the housing. The proposed fixture housing for recessed speaker provides this solution.

BRIEF SUMMARY OF THE INVENTION

It is an object of the fixture housing using dog ears to be installed from one side of a wall or ceiling. Installing the fixture housing for recessed speaker from just one side of a wall allows an installer to install the fixture within a finished house. This significantly increases the ability of the installer to place the fixture in a location that provides the best sound quality as opposed to using a location that provides the best access for the structure of the house and stud/joist locations.

It is an object of the fixture housing using dog ears to provide for quick installation that requires just a sheetrock, drywall or equivalent saw. An installer can use a stud finder to identify where the stud is located to ensure that the mounting hole is not cut through a stud or joist that is not visible from the installation wall. Once the ideal location is identified the installer uses a saw to cut a square or round opening in the desired location. The installation of the fixture housing can then be pushed into the opening for installation without requiring the use of any additional tools or requiring access to the back of the wall, ceiling or floor.

It is another object of the fixture housing using dog ears to be configured for installation of controls, lighting or speakers. The fixture housing includes a plurality of spring loaded dogs that are operated from the visible wall or ceiling surface. The installer simply lift the housing through the opening, and then turns installation heads located in the corners of the housing to lock the housing within the wall or ceiling. Wiring can be connected to installation of a speaker, control or lighting or can be connected after it is installed depending upon the access behind the wall, ceiling or floor.

It is still another object of the fixture housing using dog ears to be configured as a single pre-assembled unit. The pre-assembled unit is sold as a single complete housing where an installer simply pushes the housing through the opening. The securing tabs fold inward to clear the hole opening and then fold back out where the securing ears are brought down onto the back side of the opening to secure the fixture. It is also possible for the fixture to be removed by lifting the locking tabs and sliding securing ears where the entire fixture can then be pulled back through the open hole.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
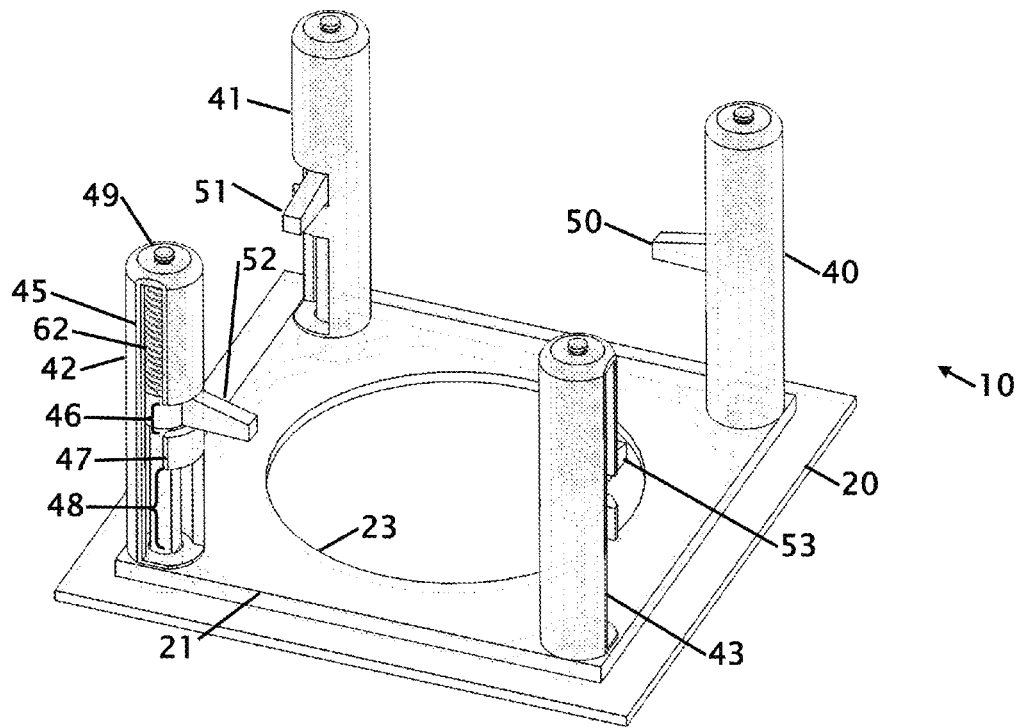
FIG. 1 shows a perspective view of the fixture housing using dog ears in free space.

FIG. 1 shows a perspective view of the fixture housing using dog ears 10 in free space. This figure shows the fixture housing using dog ears 10 having en essentially planar bottom surface 20 that is square is outside shape with an inner vertical wall 21. The center has a circular opening 23. Four securing mechanism cylinders 40, 41, 42 and 43 extend from the planar surface. Within each of the cylinders 40-43 are spring 60 loaded dog ears 50, 51, 52 and 53. It should be noted that the shown embodiment is configured for a square opening where the vertical wall 21 fits into the square opening, but the fixture housing using dog ears 10 could be configured in a round configuration with as few as two dog ears. It is further contemplated that the fixture housing using dog ears 10 could be configured in a rectangular, triangular, pentagonal, octagonal, elliptical or other configuration with three or more dog ear retainers.

Figure 2:
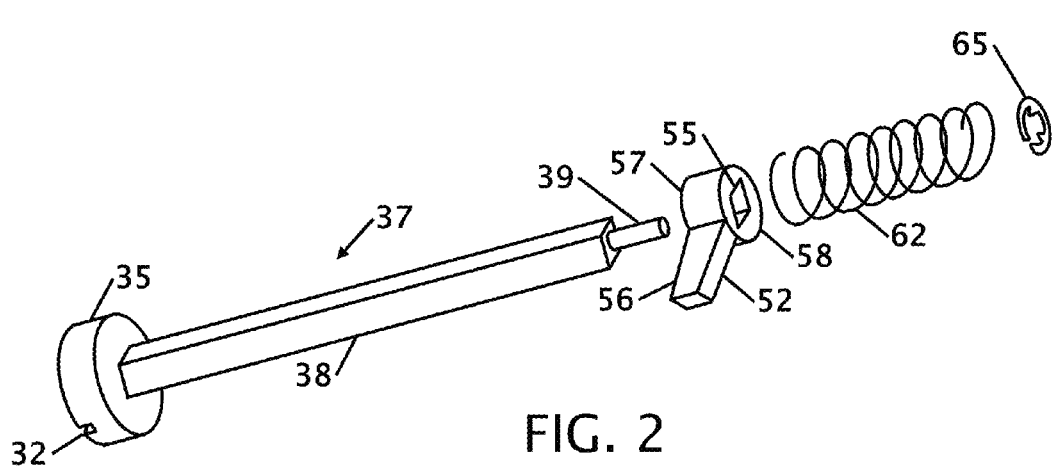
FIG. 2 shows an exploded view of the dog ear.

The components of the dog ear retainers are shown in FIG. 2. FIG. 2 shows an exploded view of the dog ears 10. Using the components in the cylindrical column 42 in FIG. 1 with the exploded view of FIG. 2 shows the components and operation of the dog ears 50-53 within the cylinders 40-43. This operation description is essentially the same for all of the dog ears 50-53.

A square shafted 38 post 37 is inserted into the cylindrical column 42 with the dog ear 52 slid over the square 38 post. The head 35 of the post 37 fits within a pocket in the bottom surface 20 that prevents the head of the post 37 from passing through the planar inside surface and into the cylindrical column. A spring 62 pushes the dog ear 52 arm down within the cylindrical column 42. The spring(s) 62 is retained within the cylindrical interior 45 of the cylindrical column.

A cylindrical tip 39 on the end of the square 38 post extends out the top 49 of the cylindrical column 42 where it is retained with a clip 65, speed nut or similar retainer including but not limited to expanding the top, a latch or a tab that retains the end of the cylindrical tip 39 from being pushed out of the cylindrical column 42. The dog ear 52 has two normal positions, a retained and a deployed position. The retained position is shown in FIG. 1 where the dog ear 52 is held on a ledge 47 where the spring 62 pushes on the top 58 of the dog ear 52 that forces the bottom 57 of the dog ear onto the ledge 47.

An installer can place a coin, screwdriver or similar tool into the slot 32 hole or receiver and rotate the post 37. The rotation turns the square 38 post and that turns the opening 55 in the dog ear 52. When the dog ear 52 is sufficiently rotated, the dog ear 52 will clear the opening 46 in the cylindrical post 42 where the dog ear 52 will be pushed by the spring 62 down opening 48. The dog ear 52 will make contact with either a wall (as shown and described in FIGS. 4 and 5) or will make contact with the inside of the planar inside surface of the fixture housing using dog ears 10.

Removal of the fixture housing using dog ears 10 from a wall or ceiling can be performed by rotating the post 37 in an opposite direction of installation where the dog ear will slip off of the wall or ceiling where the dog ear 52 rotate into the opening 48 and then onto the inside wall of the planar surface. The same operation can be performed with the remaining dog ears 50-53 and the fixture housing using dog ears 10 can be pulled from the wall or ceiling. The dog ears 50-53 can then be "re-loaded" for a subsequent installation where the installer lifts and rotates the dog ears 50-53 onto the respective shelf 47 within each column 40-43. This allows for complete removal of the fixture housing using dog ears 10 where it can be reused in future installation.

Figure 3:
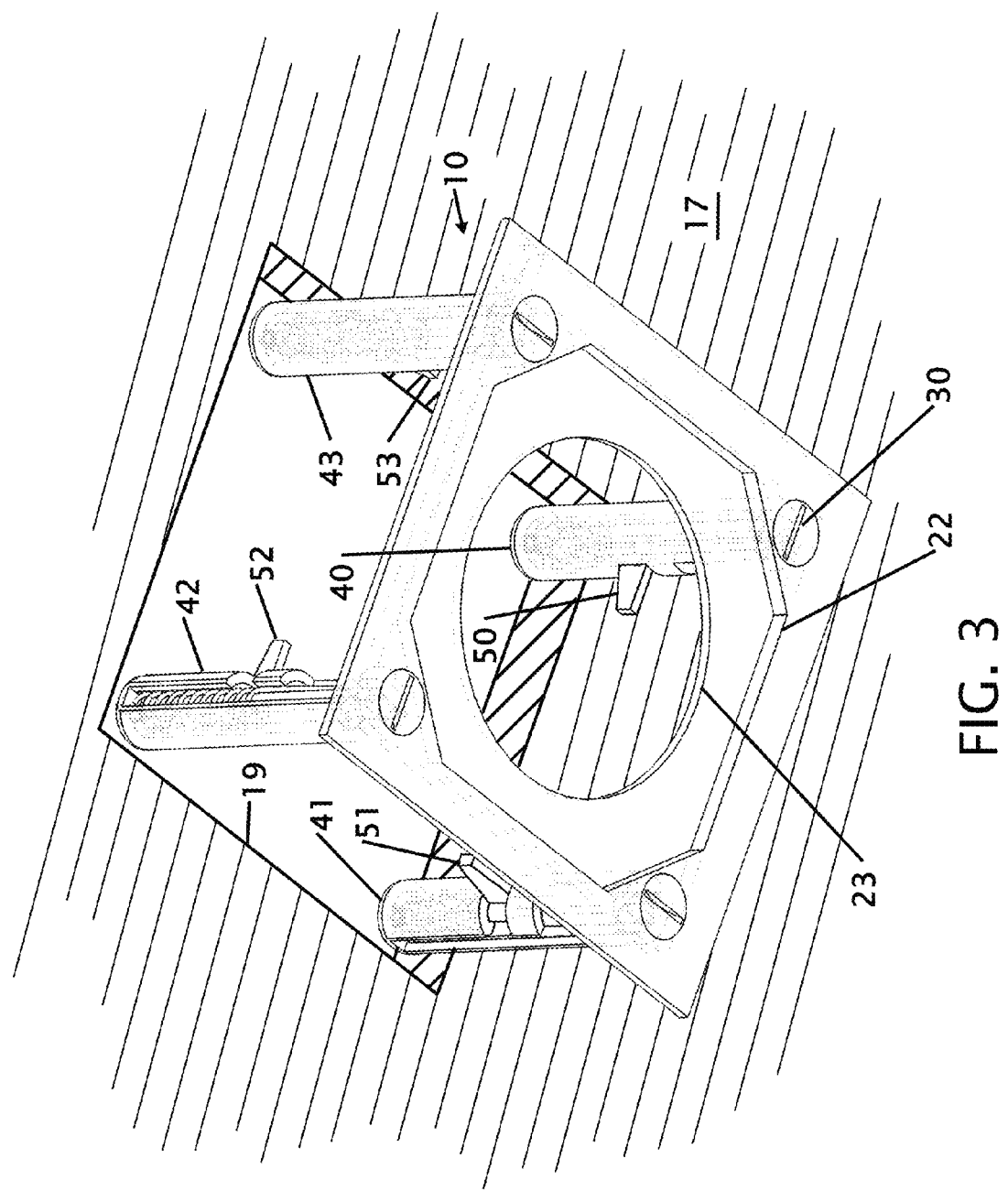
FIG. 3 shows a perspective view of the fixture housing using dog ears a hole that accepts the fixture housing.

FIG. 3 shows a perspective view of the fixture housing using dog ears 10 a hole 19 that accepts the fixture housing. The hole 19 is shown cut through a wall or ceiling in drywall, sheetrock or similar wall material. This view is from the interior or outside surface 17. In the embodiment shown the hole 19 is cut square, but could also be cut as a round hole where the fixture housing using dog ears 10 is sized and shaped to fit within the round hole. This figure shows the dog ears 50-53 rotated inward to clear the hole 19 in the wall or ceiling 17. The dog ears 50-53 are shown in the raised locked position in the cylinders 40-43.

From this underside view the through hole 23 of the fixture housing using dog ears 10 is shown as a round hole where a speaker can pass through the fixture housing using dog ears 10. The head(s) 30 of the shafts that control the position of the dog ears 50-53 is shown. It should be noted that the orientation of the slot in the head(s) 50 indicate the orientation position of the dog ear(s) thereby allowing an installer to know in a dog ear 50-53 has been deployed.

An octagonal type shaped recess 22 is shown in the underside. This shape provides a recess for a frame housing of the speaker to sit within the fixture housing using dog ears 10. From this figure the fixture housing using dog ears 10 is lifted or pushed into the hole 19 where the planar back surface of the base frame sits against the wall face 17. Securing the fixture housing using dog ears 10 is shown and described in FIGS. 4 and 5 herein.

Figure 4:
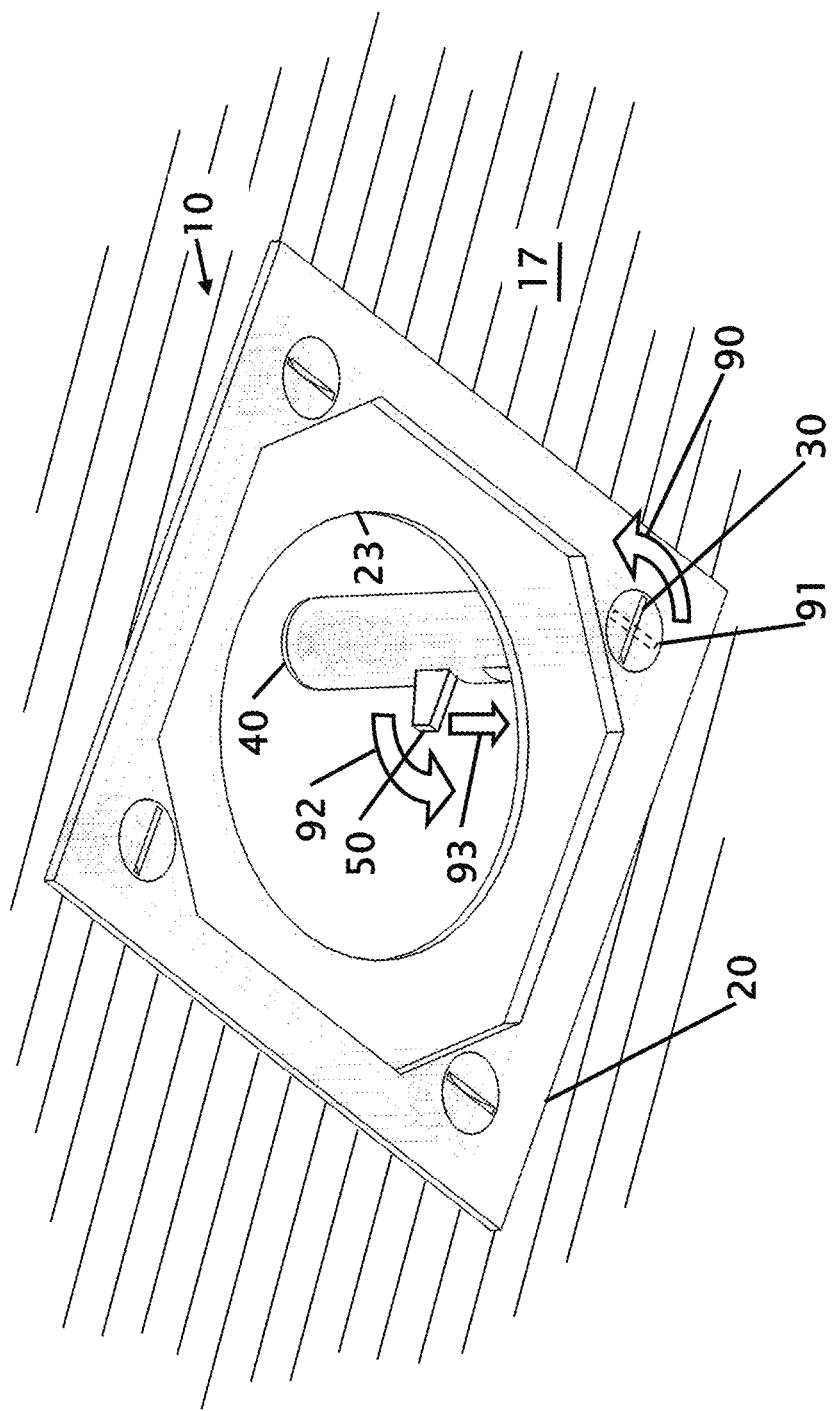
FIG. 4 shows a perspective of the fixture housing using dog ears from the inside of the room moved into the hole.
Figure 5:
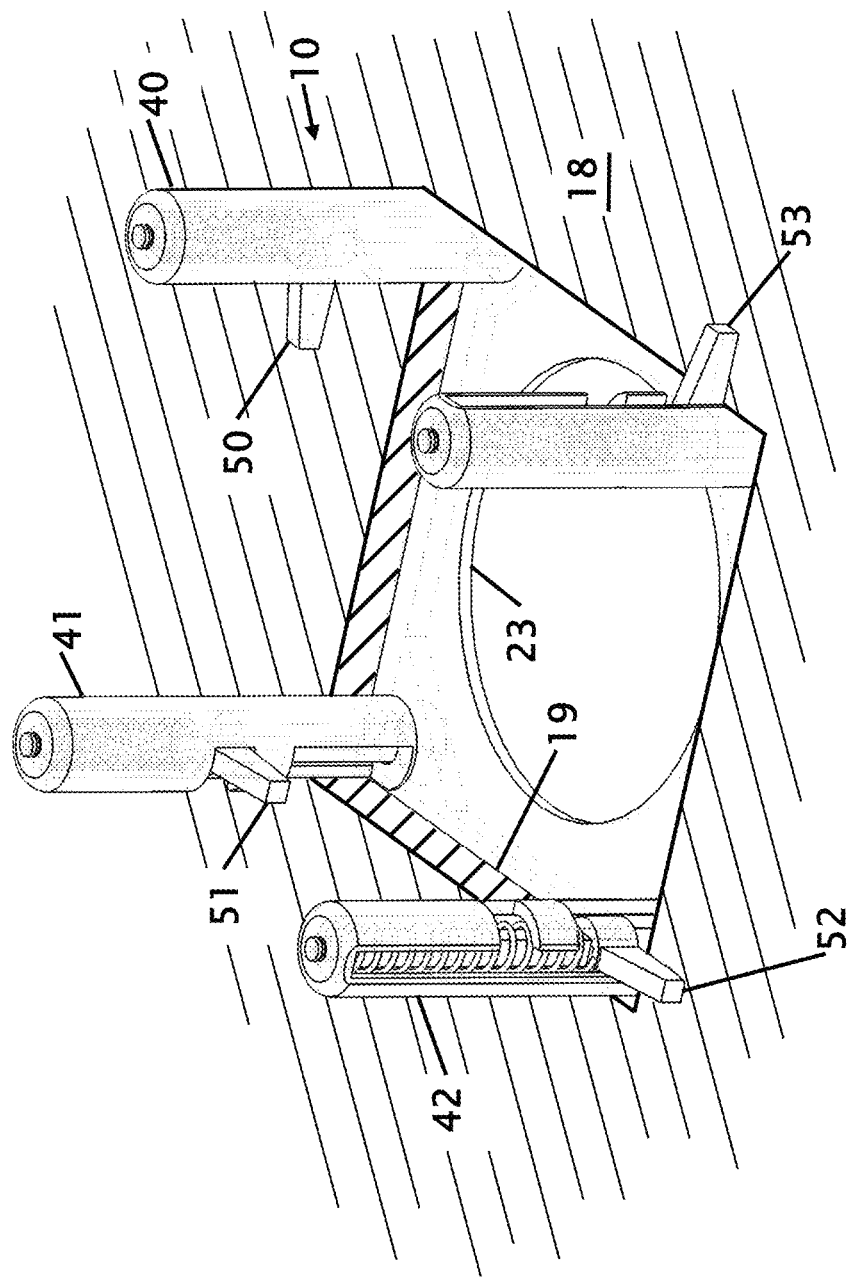
FIG. 5 shows a perspective from behind a wall with some of the dog ears of the fixture housing rotated onto position behind the wall.

FIG. 4 shows a perspective of the fixture housing using dog ears 10 from the inside of the room moved into the hole and FIG. 5 shows a perspective from behind a wall with some of the dog ears 10 of the fixture housing rotated onto position behind the wall 17/18. The under surface of the of the planar surface 20 is brought into contact with the wall or ceiling through the hole 19. An installer inserts a tool into each slot 30. The slot 30 is preferably configured to accept a coin, such as a dime, nickel or penny, thereby eliminating the need for a resident installing the fixture housing using dog ears 10 to purchase a tool they might not have.

In FIG. 4, one of the dog ears 50 is visible through the opening 23. An octagonal type shaped recess 22 is shown in the underside. The dog ear 50 is shown initially resting on the supporting ledge to prevent the dog ear 50 from lowering. The installer inserts a tool or coin into the slot 30 and rotates 90 the head. The rotation 90 of the head will turn 92 the dog leg 50 until the dog leg 50 clears the supporting shelf, wherein the spring (60 shown in FIGS. 1 and 2) within the cylinder 40 will force the dog leg 50 to drop 93 towards the interior surface 18 of the wall or ceiling to retain the respective corner of the fixture housing using dog ears 10 onto the wall or ceiling.

This process is continued for the remaining corners of the fixture housing using dog ears 10 where each dog leg 51-53 is rotated within the respective cylindrical housing 41-43 until all the dog legs 51-53 have been lowered to secure the fixture housing using dog ears 10 onto the wall or ceiling. An installer can make a visual inspection of the orientation of the heads of the fixture to ensure that each of the dog legs have been deployed. The fixture housing using dog ears 10 can be removed from the ceiling or wall as described with FIG. 6.

Figure 6:
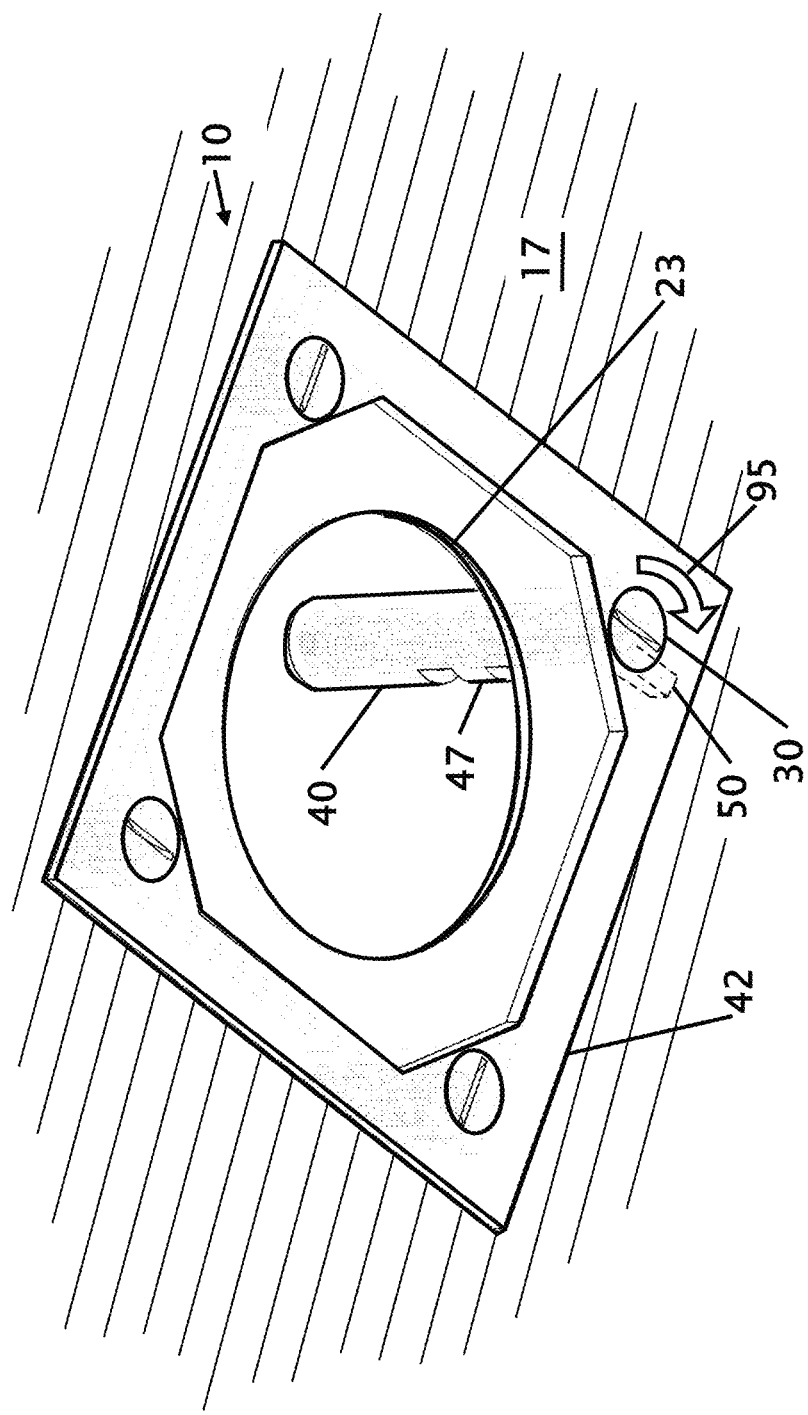
FIG. 6 shows a perspective of the fixture housing using dog ears installed into the wall or ceiling.
Figure 7A:
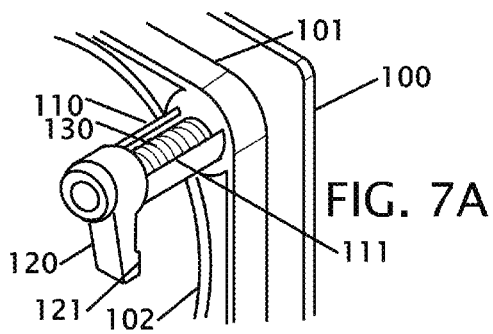
FIGS. 7A and 7B show a second preferred embodiment prior to installation.
Figure 8A:
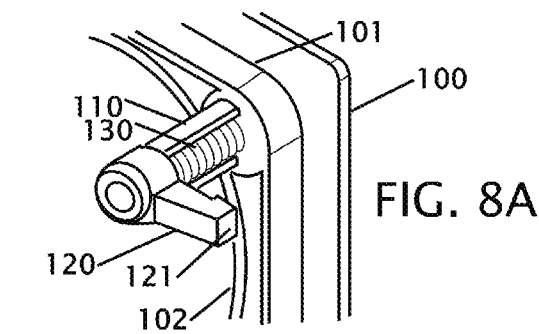
FIGS. 8A and 8B show the second preferred embodiment with the ears initially rotated
Figure 7B:
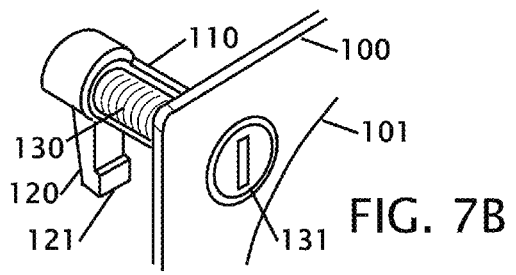
Figure 8B:
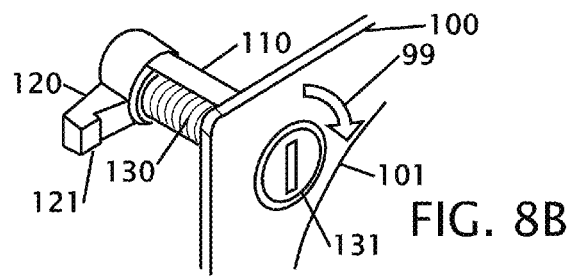

FIG. 6 shows a perspective of the fixture housing using dog ears 10 installed into the wall or ceiling. Looking though the center hole 23 it can be visually seen that the dog leg 50 is not resting at on the supporting ledge. To remove the fixture housing using dog ears 10 the head 30 can be rotated 94 to drop the dog leg onto the inside of the planar face where the dog leg(s) 50 are no longer in contact with the wall or ceiling. When all four dog legs have been released, the fixture 10 can be dropped or pulled from a wall or ceiling 17. The dog legs can then be manually reset by rotating the dog legs out, lifting the dog legs up the cylindrical tube 40 and then rotating the dog legs over the respective supporting shelf 47 (as shown in FIG. 1).

FIGS. 7-11 show a second preferred embodiment. The A version is a perspective view from inside a wall or ceiling and the B version is a perspective view from within a room viewing the frame in a ceiling or wall. FIGS. 7A and 7B show a second preferred embodiment prior to installation, FIGS. 8A and 8B show the second preferred embodiment with the ears initially rotated, FIGS. 9A and 9B show the second preferred embodiment with the ears drawn onto the interior of a wall or ceiling, FIGS. 10A and 10B show the second preferred embodiment with the ears tightened onto the wall or ceiling. While only one ear is shown it should be understood that three or more ears are typically used to secure a frame in a wall or ceiling.

In this second preferred embodiment the fixture housing is essentially a planar supporting surface 100. The planar supporting surface 100 having an opening 102. The planar supporting surface 100 having a plurality of tubes 110 extending perpendicular to the planar supporting surface 100 on a first side of the planar supporting surface 100. Each of the plurality of tubes 110 having a threaded central shaft 130 and a slider 120. Each slider 12 is keyed to each of their respective tubes 110 whereby rotation 99 of the said threaded central shaft 130 rotates their slider 120. Each slider 120 has an ear 121 that extends outside of the tube 110. Each tube 110 has a linear slot whereby the ear 121 rotates and translates within the linear slot 111 and an end of the ear 121 is rotatable over and above the planar supporting surface 100. Rotating the threaded central shaft 130 in a first direction 99 rotates the ear 121 outside of the planar supporting surface 100.

Figure 9A:
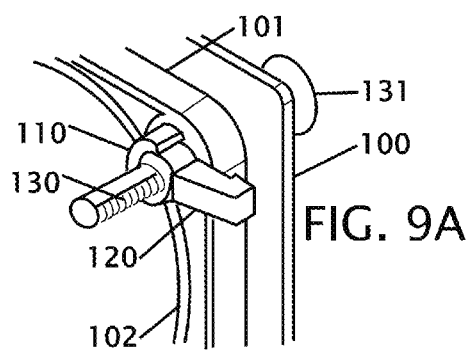
FIGS. 9A and 9B show the second preferred embodiment with the ears drawn onto the interior of a wall or ceiling.
Figure 10A:
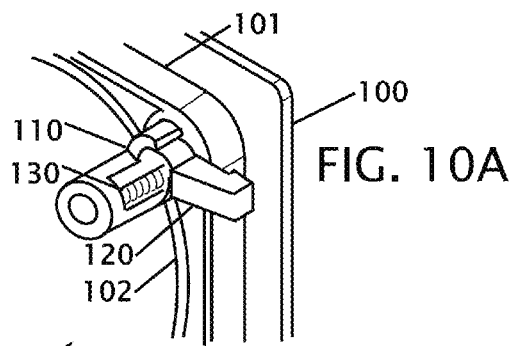
FIGS. 10A and 10B show the second preferred embodiment with the ears tightened onto the wall or ceiling.
Figure 9B:
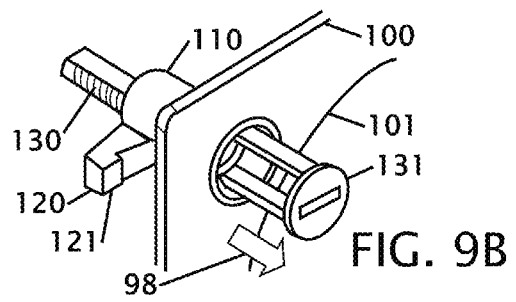
Figure 10B:
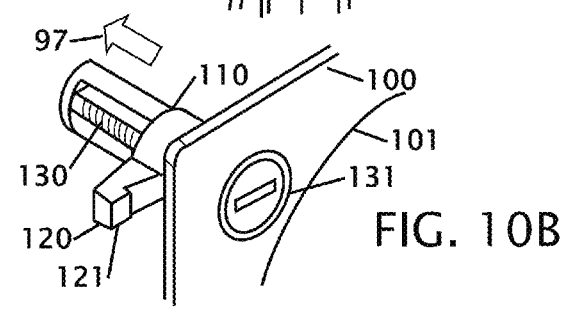

Rotating the central shaft 130 in the first direction further translates the ear 121 towards the planar supporting surface 100. Rotating the central shaft 130 is the first 99 direction sandwiches a wall or ceiling (not shown) between the ear 121 towards the planar supporting surface. There are at least three tubes 110, threaded central shafts 130 and sliders 120 to support the fixture onto a wall or ceiling. The tube 110 is movable within the planar supporting surface 110 as shown in FIGS. 9A and 9B. The planar supporting surface 100 has a raised lip 102 that centers the planar supporting surface 100 in a hole in a wall or ceiling.

Figure 11A:
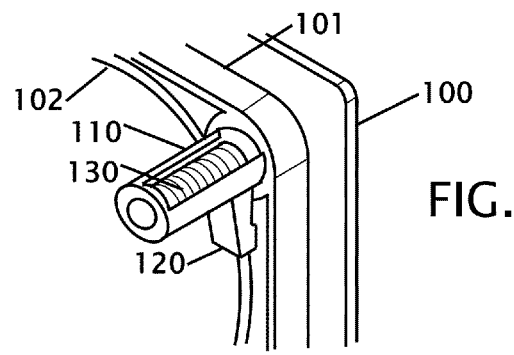
FIGS. 11A and 11B show the second preferred embodiment in the process or being removed with the ears rotated off of the wall or ceiling.
Figure 11B:
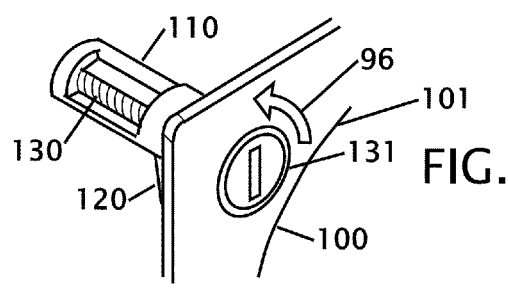

FIGS. 11A and 11B show the second preferred embodiment in the process or being removed with the ears 121 rotated off of the wall or ceiling. Rotating the threaded central shaft 130 in a second direction 97 rotates the earl 21 towards a center of the planar supporting surface 100. Rotating the central shaft 130 in the second direction 96 further translates the ear 121 away the planar supporting surface 100. Rotating the central shaft 130 is said second direction 96 releases the ear 121 from a wall or ceiling so the fixture is removable from the wall or ceiling.

Figure 12A:
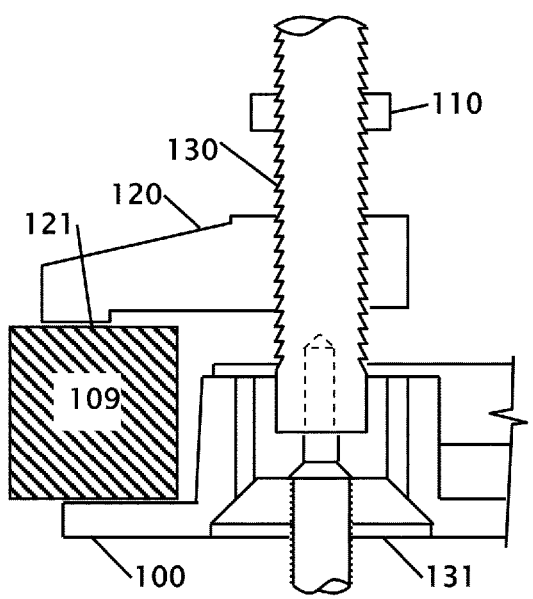
FIGS. 12A and 12B show the second preferred embodiment in a front and side plan view.
Figure 12B:
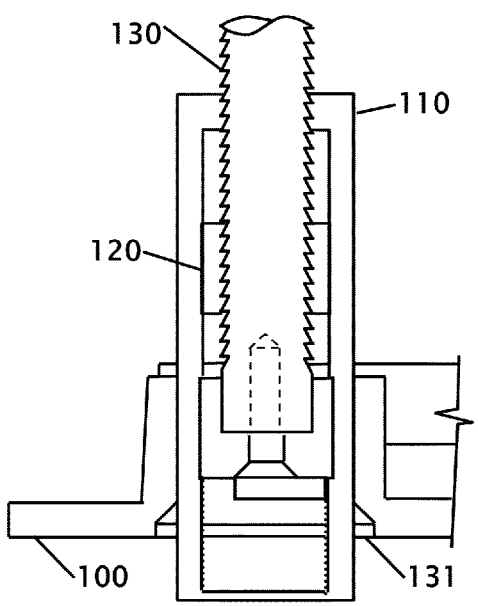

FIGS. 12A and 12B show the second preferred embodiment in a front and side plan view. In these views the central shaft 130 is shown in the planar supporting surface with the ear 121 clamping a wall or ceiling 109.

Thus, specific embodiments of a fixture housing with dog ears have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A fixture housing with dog ears comprising:
a planar supporting surface;
said planar supporting surface having an opening;
said planar supporting surface having a plurality of tubes extending perpendicular to said planar supporting surface on a first side of said planar supporting surface;
each of said plurality of tubes having a central shaft having a square cross-section, a spring and a slider;
said slider having a square central opening whereby said slide is keyed to said central shaft whereby rotation of said central shaft rotates said slider;
said slider has an ear that extends outside of said tube;
said tube has a linear slot a first radial slot that elevates said ear above said planar supporting surface and at least a second radial slot between said first radial slot and said planar supporting surface, said radial slots both being parallel to said planar supporting surface to allow said ear to move and rotate within said linear slot and said at least two radial slots;
said spring is arranged within said tube and around said central shaft to exhort force on said slider towards said planar supporting surface whereby said ear is adapted to clamp a wall or ceiling between said planar supporting surface and said ear, and
when said slider is extended to said supporting surface, said central shaft is rotatable within said second radial slot to move said ear off of said wall or said ceiling whereby allowing removal of said fixture housing.

2. The fixture with dog ears according to claim 1 wherein said ears are configured to extend between a retained position and an expanded position.

3. The fixture with dog ears according to claim 1 wherein said at least two radial slots have a first slot that retains said ear in an elevated position above said planar supporting surface.

4. The fixture housing with dog ears according to claim 3 wherein said at least two radial slots have a second slot that allows said ear to exist between said planar supporting surface and said first slot.

5. The fixture with dog ears according to claim 1 wherein there are at least three sets of tubes, central shafts, sliders and springs.

6. The fixture with dog ears according to claim 1 wherein said planar supporting surface is secured on a ceiling or wall with clamping force between said planar supporting surface and said ear.

7. The fixture with dog ears according to claim 1 wherein said central shaft has a first end with a coin slotted head and clearance around said coin slotted head whereby allowing an installer to use a coin to freely rotate said central shaft to install and remove said fixture housing.

8. The fixture with dog ears according to claim 7 wherein said slotted head rotates said slider.

9. The fixture with dog ears according to claim 8 wherein said rotation dislodges said slider from said a first of said at least two radial slots.

10. The fixture with dog ears according to claim 1 wherein said planar supporting surface has a raised lip that centers said planar supporting surface in a hole.

11. A fixture housing with dog ears comprising:
a planar supporting surface;
said planar supporting surface having an opening;
said planar supporting surface having a plurality of tubes extending perpendicular to said planar supporting surface on a first side of said planar supporting surface;
each of said plurality of tubes having a threaded central shaft and a slider;
said slider is keyed to each said respective tube whereby rotation of said threaded central shaft rotates said slider;
said slider has an ear that extends outside of said tube;
said tube is movable within said planar supporting surface with said slider and said threaded central shaft;
said tube has a linear slot whereby said ear rotates and translates within said linear slots;
rotation of said threaded central tube in a first direction rotates said slider to a first stop and further rotation of said threaded central shaft translates said slider on said threaded central shaft;
an end of said ear is rotatable over and above said planar supporting surface whereby said ear is adapted to clamp a wall or ceiling between said planar supporting surface and said ear, and
when said slider is extended to said supporting surface, said central shaft is rotatable in a second direction, in said second direction of rotation, said ear translates to unclamp said ear off of said wall or said ceiling, and further rotation of said threaded central tube in said second direction rotates said ear clear of said wall or ceiling, whereby allowing removal of said fixture housing.

12. The fixture with dog ears according to claim 11 wherein rotating said threaded central shaft in a first direction rotates said ear outside of said planar supporting surface.

13. The fixture with dog ears according to claim 11 wherein rotating said central shaft in said first direction further translates said ear towards said planar supporting surface.

14. The fixture with dog ears according to claim 13 wherein rotating said central shaft is said first direction sandwiches a wall or ceiling between said ear towards said planar supporting surface.

15. The fixture with dog ears according to claim 11 wherein rotating said threaded central shaft in a second direction rotates said ear towards a center of said planar supporting surface.

16. The fixture with dog ears according to claim 15 wherein rotating said central shaft in said second direction further translates said ear away said planar supporting surface.

17. The fixture with dog ears according to claim 16 wherein rotating said central shaft is said second direction releases said ear from a wall or ceiling so said fixture is removable from said wall or ceiling.

18. The fixture with dog ears according to claim 11 wherein there are at least three tubes, threaded central shafts and sliders.

19. The fixture with dog ears according to claim 11 wherein said planar supporting surface has a raised lip that centers said planar supporting surface in a hole in a wall or ceiling.

* * * * *